United States Patent
Noguchi

(10) Patent No.: US 9,723,210 B2
(45) Date of Patent: Aug. 1, 2017

(54) IMAGE PROCESSING APPARATUS AND METHOD OF CONTROLLING IMAGE PROCESSING APPARATUS

(71) Applicant: CANON KABUSHIKI KAISHA, Tokyo (JP)

(72) Inventor: Masaaki Noguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/831,545

(22) Filed: Aug. 20, 2015

(65) Prior Publication Data

US 2016/0057351 A1 Feb. 25, 2016

(30) Foreign Application Priority Data

Aug. 25, 2014 (JP) ................................ 2014-170890

(51) Int. Cl.
*H04N 5/228* (2006.01)
*H04N 5/232* (2006.01)

(52) U.S. Cl.
CPC .............................. *H04N 5/23264* (2013.01)

(58) Field of Classification Search
None
See application file for complete search history.

(56) References Cited

U.S. PATENT DOCUMENTS 6,332,060 B1 * 12/2001 Miyamoto ............... G03B 5/00
396/55

FOREIGN PATENT DOCUMENTS

JP 2004-301939 A 10/2004
JP 2013-104921 A 5/2013

* cited by examiner

*Primary Examiner* — Stephen Coleman
(74) *Attorney, Agent, or Firm* — Cowan, Liebowitz & Latman, P.C.

(57) ABSTRACT

An image processing apparatus comprising: a first obtaining unit configured to obtain a focal length of an imaging optical system; a second obtaining unit configured to obtain a distance to a subject; a setting unit configured to set a movable range for a correction unit configured to correct camera shake, based on the focal length and the distance to a subject; and a calculation unit configured to calculate a correction amount for correcting the camera shake within the movable range that was set by the setting unit, based on a camera shake signal from a camera shake detection unit configured to detect camera shake and output the camera shake signal.

15 Claims, 4 Drawing Sheets

IMAGE PROCESSING APPARATUS AND METHOD OF CONTROLLING IMAGE PROCESSING APPARATUS

BACKGROUND OF THE INVENTION

Field of the Invention

The present invention relates to an image processing apparatus and a method of controlling an image processing apparatus.

Description of the Related Art

Generally, in an image capturing apparatus such as a digital camera, shaking of the actual image capturing apparatus is detected, and image blur caused by this camera shake is corrected. When this correction is performed, a movable lens member (an image stabilization lens and a holding member for the same) that can be shifted is driven by an image stabilization apparatus so as to correct the image blur.

Also, there are many cases in which an angular velocity meter and an accelerometer are used when detecting camera shake in the image stabilization apparatus. For example, an image stabilization device that detects angular shake using an angular velocity meter and suppresses image blur by moving a portion of imaging lenses or an image sensor is built into various optical instruments. However, in close range shooting, it is not possible to ignore image degradation caused by vibration that cannot be detected by the angular velocity meter alone, in other words so-called translational shake acting in the horizontal direction or the vertical direction in a plane orthogonal to the optical axis of the camera. For example, in the case of macro imaging in which the camera is approximately 20 cm away from a subject, there is a need to proactively detect and correct the translational shake. An accelerometer is often used to detect this translational shake.

The image stabilization apparatus obtains a camera shake amount and direction from obtained angular velocity information and acceleration information, and outputs a correction position control signal for driving the movable lens member so as to cancel out the image blur. When the movable lens member is driven, the current position of the movable lens member is fed back to the image stabilization apparatus as a movable member position signal. Then, the image stabilization apparatus performs feedback control to output a correction position control signal that corresponds to the movable member position signal.

Also, an image stabilization device and an image capturing apparatus have been proposed with which power saving can be achieved by activating and stopping image stabilization in accordance with the focal length and the distance to a subject (imaging magnification) when a subject image is displayed as a moving image on an LCD (see Japanese Patent Laid-Open No. 2013-104921). With a digital camera, a moving image can be displayed on the screen of an LCD or the like, but there are cases in which even if camera shake influences the recorded subject image, it will not influence the subject image displayed as a moving image, that is to say the user will not perceive the image blur. In the case in which image stabilization is also executed during moving image display, image stabilization is executed even if the camera shake has no influence on the moving image during wide angle shooting, and thus power is wastefully consumed.

In view of this, in Japanese Patent Laid-Open No. 2013-104921, control such as the following is proposed for the period in which a moving image sensed on a wide angle side with a short focal length is being displayed. Specifically, it is determined whether or not the displacement amount of the subject image for display due to camera shake exceeds the pixel pitch of the display screen, and in the case in which the user cannot perceive image blur in the subject image for display, or in the case in which the user is not bothered by the image blur very much, either the degree of stabilization operation of the image stabilization mechanism is reduced or an operation stop state is entered. On the other hand, in the case in which the user can perceive image blur of the subject image for display, the image stabilization mechanism is activated, and the degree of stabilization operation is increased. Also, as explained before, when the subject is at a close range and the magnification ratio is high as in macro imaging, the influence of the angular shake and the translational shake increases, and thus even in wide angle shooting, the image stabilization mechanism is made active in accordance with the distance to the subject in order to raise the suppression effect.

Also, in image data obtained by an image capturing apparatus, there is generally a tendency for the margins, including the four corners, to be darker than the center. Particularly, the phenomenon in which the amount of light in the margins decreases relative to the center is called "shading". The larger the decreasing rate of the amount of light in the margin portion relative to the center (marginal illumination) is, the worse the image data quality becomes. A decrease in the marginal illumination is an intrinsic characteristic of the lenses, and for this reason it can be said to be the characteristic that causes variance in the luminance in the four corners. The decreasing rate of the marginal illumination changes in accordance with the zoom magnification rate, that is to say the zoom lens position as well. Furthermore, when the image stabilization lens shifts from the optical axis, the amount of light in the region on the side opposite to the shifted direction decreases, and attachment position error of the image sensor and the like is also a factor in the decrease in the amount of light. There has been a need to determine a movable range for a correction lens so that shading does not have an influence on images to be displayed or recorded, taking into consideration all of these factors in the decrease in the amount of light.

Furthermore, depending on the arrangement of an optical lens group, there are cases in which the amount of light also decreases due to the position of the focus lens that performs focus adjustment. For example, if the mechanism of the focus lens group is an inner focus type, there are cases in which the effective focal length decreases due to shifting the position of the focus lens to the front lens side for the purpose of being in focus when performing macro-imaging at close range, and thus the marginal illumination decreases.

For this reason, in the case of determining the movable range of the correction lens at each zoom lens position as described in Japanese Patent Laid-Open No. 2013-104921, there has been an issue in which a decrease in marginal illumination becomes noticeable when performing macro imaging, depending on the arrangement of the optical lens group. Also, if the movable range is set according to the movable range when performing macro-imaging, there has been an issue in which the movable range in a normal shooting range becomes narrow, and a sufficient correction effect cannot be obtained for large camera shakes such as those that occur when shooting while walking.

SUMMARY OF THE INVENTION

The present invention has been made in consideration of the above situation, and prevents significant deterioration in image quality caused by shading, while also utilizing an image stabilization effect.

According to the present invention, provided is an image processing apparatus comprising: a first obtaining unit configured to obtain a focal length of an imaging optical system; a second obtaining unit configured to obtain a distance to a subject; a setting unit configured to set a movable range for a correction unit configured to correct camera shake, based on the focal length and the distance to a subject; and a calculation unit configured to calculate a correction amount for correcting the camera shake within the movable range that was set by the setting unit, based on a camera shake signal from a camera shake detection unit configured to detect camera shake and output the camera shake signal.

Further, according to the present invention, provided is an image processing apparatus comprising: an obtaining unit configured to obtain a distance to a subject; a determination unit configured to determine whether or not macro imaging is being performed based on the distance to a subject; a setting unit configured to, in a case in which the macro imaging is being performed, set a movable range of a correction unit that corrects camera shake narrower than in a case in which the macro-imaging is not being performed; and a calculation unit configured to calculate a correction amount for correcting the camera shake within the movable range that was set by the setting unit, based on a camera shake signal from a camera shake detection unit configured to detect camera shake and output the camera shake signal.

Furthermore, according to the present invention, provided is a method of controlling an image processing apparatus, comprising: a first obtaining step of obtaining a focal length of an imaging optical system; a second obtaining step of obtaining a distance to a subject; a setting step of setting a movable range for a correction unit that corrects camera shake, based on the focal length and the distance to a subject; and a calculation step of calculating a correction amount for correcting the camera shake within the movable range that was set in the setting step, based on a camera shake signal from a camera shake detection unit configured to detect camera shake and output the camera shake signal.

Further, according to the present invention, provided is a method of controlling an image processing apparatus, comprising: an obtaining step of obtaining a distance to a subject; a determination step of determining whether or not macro imaging is being performed based on the distance to a subject; a setting step of, in a case in which the macro imaging is being performed, setting a movable range of a correction unit that corrects camera shake narrower than in a case in which the macro-imaging is not being performed; and a calculation step of calculating a correction amount for correcting the camera shake within the movable range that was set in the setting step, based on a camera shake signal from a camera shake detection unit configured to detect camera shake and output the camera shake signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Figure 1:
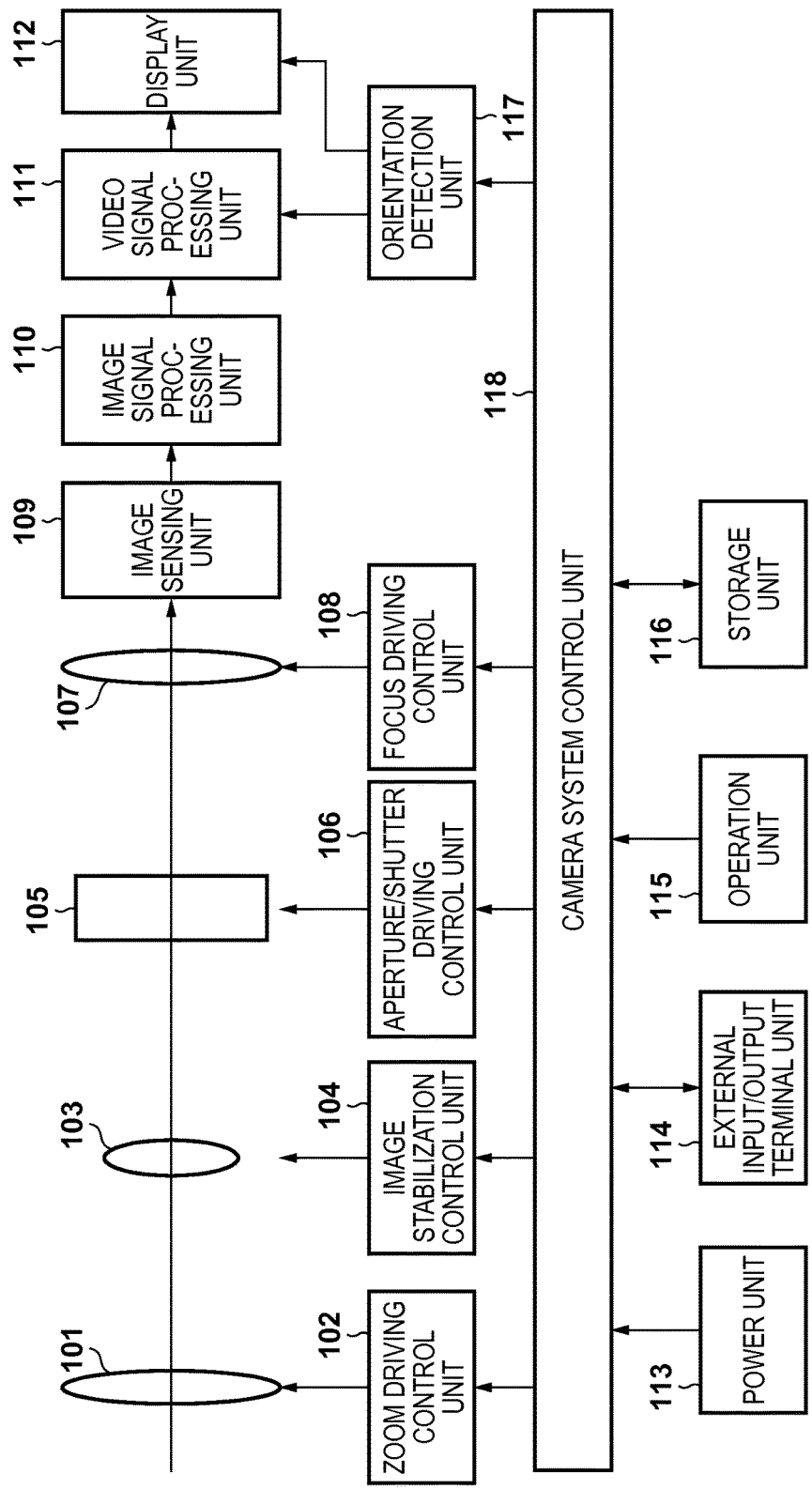
FIG. 1 is a block diagram of an image capturing apparatus according to an embodiment of the present invention.

FIG. 1 is a block diagram showing a functional configuration example of an image capturing apparatus according to an embodiment of the present invention. In the present embodiment, the image capturing apparatus is assumed to be a digital still camera, but it may also have a moving image shooting function.

In FIG. 1, a zoom unit 101 is a portion of the imaging lens that constitutes the imaging optical system, and includes a zoom lens that changes lens magnification. A zoom driving control unit 102 controls driving of the zoom unit 101 in accordance with control by a camera system control unit 118. A correction lens 103 is configured so as to be able to shift in a direction orthogonal to the optical axis of the imaging lens, and the driving thereof is controlled by an image stabilization control unit 104. Note that the image stabilization control unit 104 includes an angular velocity sensor that detects angular shake that occurs in the image capturing apparatus and an acceleration sensor that detects translational shake in a plane that is orthogonal to the optical axis.

An aperture/shutter unit 105 is a mechanical shutter that has an aperture function. An aperture/shutter driving control unit 106 drives the aperture/shutter unit 105 in accordance with control by the camera system control unit 118. A focus lens 107 is a portion of the imaging lens and is configured to be able to change its position along the optical axis of the imaging lens. A focus driving control unit 108 drives the focus lens 107 in accordance with control by the camera system control unit 118. In the present embodiment, the focus lens 107 has an inner focus type arrangement.

An image sensing unit 109 converts an optical image that has entered via the imaging lens into an electric signal in units of pixels using an image sensor such as a CCD image sensor or a CMOS image sensor. An image signal processing unit 110 performs A/D conversion, correlated double sampling, gamma correction, white balance correction, color interpolation processing, and the like on the electric signal output from the image sensing unit 109, and converts the electric signal into a video signal. A video signal processing unit 111 manipulates the video signal output from the image signal processing unit 110 in accordance with the application. Specifically, the video signal processing unit 111 generates video for display, and performs encoding processing for recording or data filing.

A display unit 112 performs image display as necessary based on the video signal for display that the video signal processing unit 111 outputs. A power unit 113 supplies power to the entire image capturing apparatus in accordance with the application. An external input/output terminal unit 114 performs input and output of communication signals and video signals with an external apparatus. A storage unit 116 stores various data such as video information. An orientation detection unit 117 detects the orientation of the image capturing apparatus, and provides orientation information to the video signal processing unit 111 and the display unit 112. A video signal from the video signal processing unit 111 is determined as being vertically long or horizontally long by the orientation information from the orientation detection unit 117, and an image display direction on the display unit 112 is determined. The camera system control unit 118 has a CPU, a ROM, and a RAM for example, and by deploying a control program stored on the ROM to the RAM and executing it with the CPU, portions of the image capturing apparatus are controlled, and various image capturing apparatus operations including the following are realized.

An operation unit 115 has buttons and switches and the like for a user to give instructions to the image capturing apparatus, and includes a release button configured so that a first switch (SW1) and a second switch (SW2) are successively turned ON in accordance with the amount the release button is pressed. When the release button is pressed down approximately half way, the release switch SW1 is turned ON, and when fully pressed down, the release switch SW2 is turned ON. When the release switch SW1 is turned ON, the camera system control unit 118 performs automatic focus detection by controlling the focus driving control unit 108 based on an AF evaluation value calculated based on the video signal for display output by the video signal processing unit 111 to the display unit 112, for example. Also, the camera system control unit 118 performs AE processing that determines an aperture value and a shutter speed for obtaining an appropriate amount of exposure based on the luminance information of the video signal and, for example, a predetermined program diagram.

When the release switch SW2 is turned ON, the camera system control unit 118 performs imaging with the determined diaphragm value and shutter speed and controls each unit so that image data obtained by the image sensing unit 109 is stored in the storage unit 116. Also, when a through image is to be displayed in a state in which the release switch has not been pressed, the camera system control unit 118 performs preliminary determination of the diaphragm value and the shutter speed at a predetermined interval, based on the aforementioned luminance information of the video signal and the program line diagram in preparation for still image shooting.

An image stabilization switch for selecting an image stabilization mode is included in the operation unit 115. When the image stabilization mode is selected by the image stabilization switch, the camera system control unit 118 instructs the image stabilization control unit 104 to perform an image stabilization operation, and the image stabilization control unit 104 that receives this instruction performs the image stabilization operation until an image stabilization OFF instruction is given. Also, an imaging mode selection switch that allows for selection between a still image shooting mode and a moving image shooting mode is included in the operation unit 115, and image shooting is performed with imaging conditions that are appropriate to the selected imaging mode.

Also, a playback mode selection switch for selecting a playback mode is included in the operation unit 115, and the image stabilization operation is stopped when in the playback mode. Furthermore, a magnification change switch that gives a magnification change instruction is included in the operation unit 115. When a zoom magnification change instruction is given by the magnification change switch, the zoom driving control unit 102 that receives the instruction via the camera system control unit 118 drives the zoom unit 101 so as to shift the zoom unit 101 to the instructed zoom position.

Figure 2:
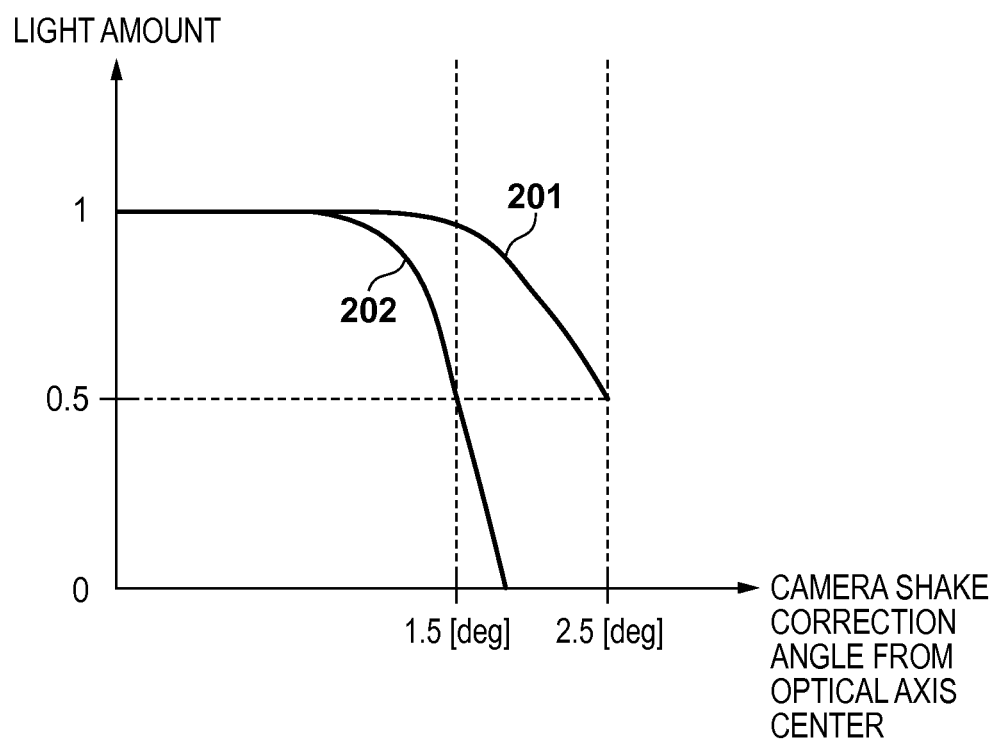
FIG. 2 is a diagram showing marginal illumination relative to camera shake correction angle of a correction lens according to the embodiment.
Figure 3:
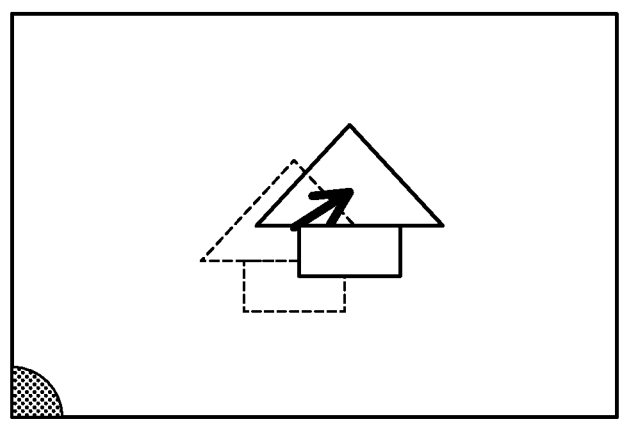
FIG. 3 is a diagram showing a relation between movement of the correction lens and a position of a drop in an amount of light according to the embodiment.

Next described is a detailed description of the position of the correction lens 103, the drop in the amount of light in the region positioned farthest from the optical axis, that is to say the four corners, and the movable range of the correction lens 103. FIG. 2 is a diagram showing the marginal illumination relative to the camera shake correction angle from the center of the optical axis of the correction lens 103 in the case in which the zoom lens is at the wide end. Note that out of the four corners, FIG. 2 shows marginal illumination at a corner located in the direction opposite to the direction of movement of the angle of view as shown in FIG. 3 when the correction lens 103 is moved.

As shown in FIG. 2, letting the marginal illumination be 1 in the case in which the correction lens 103 is at the center of the optical axis, when the position of the correction lens 103 is moved away from the center of the optical axis, the amount of light drops as the distance increases. A shading state in which the decreasing rate of the marginal illumination is greater than a predetermined decreasing rate cannot be allowed in view of image quality, and therefore the movable range of the correction lens 103 is set such that the decreasing rate of the marginal illumination does not exceed a predetermined decreasing rate. In the present embodiment, the movable range of the correction lens 103 is set such that the decreasing rate of the amount of light does not exceed 0.5.

Here, when the decreasing rate of the marginal illumination is compared using a graph 201 for the case in which the distance to a subject is in the normal imaging region and a graph 202 for the case of imaging in a macro imaging region, the decreasing rate of the marginal illumination for the macro imaging region is greater at the same distance from the center of the optical axis. This is because in the case in which the focus arrangement is an inner focus type, when the focus lens is brought to the front during macro-imaging, the effective focal length of the overall lens system becomes short, and the spreading of the light becomes larger.

In the example of the present embodiment, the movable range of the correction lens 103 according to which the decreasing rate of the marginal illumination is 0.5, which is half of that in the case in which the correction lens 103 is at the center of the optical axis, is 2.5 degrees in the normal imaging region and 1.5 degrees in the macro imaging region.

Figure 4:
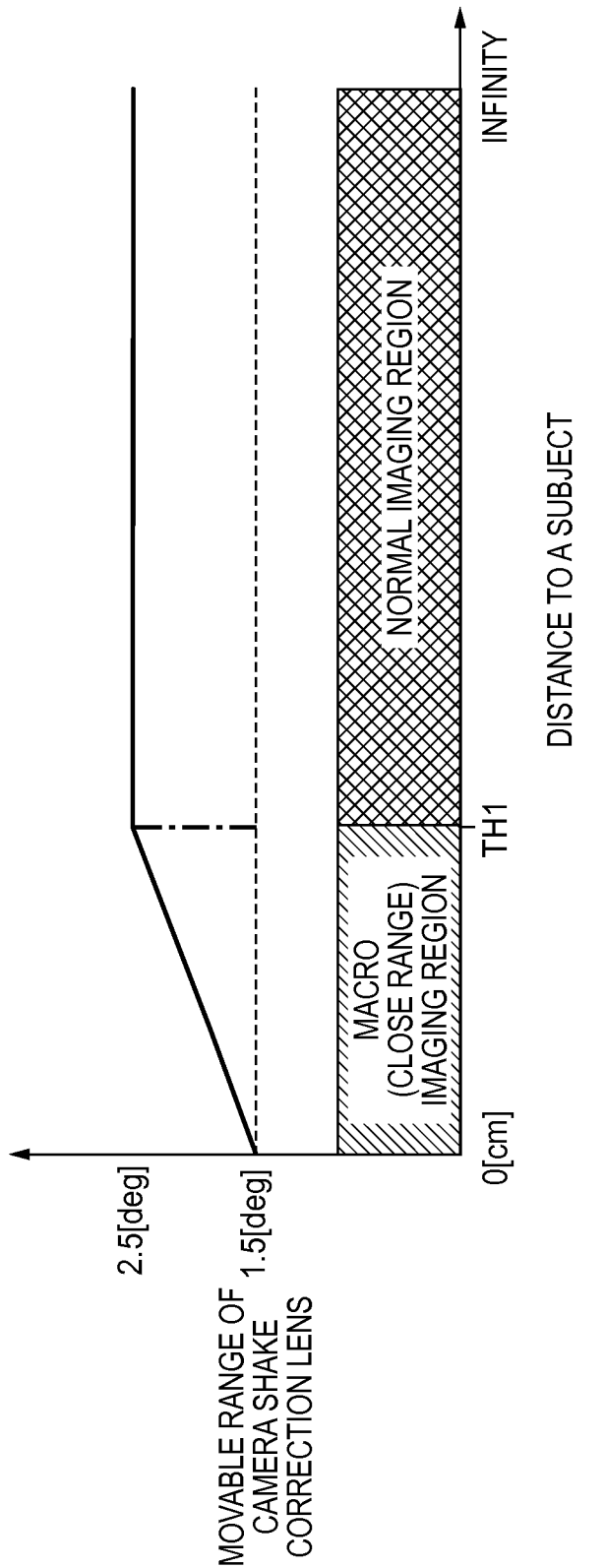
FIG. 4 is a diagram showing a relation between a distance to a subject and a movable range of a correction lens according to the embodiment.

Next, the relation between the distance to a subject and the movable range of the correction lens 103 in a case in which the zoom lens is at the wide angle end will be described using FIG. 4. In FIG. 4, the dashed line shows an example in which the movable range of the correction lens 103 is not changed according to the distance to a subject information, but rather is fixed to the movable range in the case in which the distance to a subject is in the macro imaging region which is most strongly influenced by shading. In the example shown by the dashed line, the movable range is fixed in the macro imaging region in which the drop in the amount of light is large, and therefore in the case in which the distance to a subject is in the normal imaging region, a range that is narrower than the actually allowed movable range is set, and the image stabilization effect on large camera shaking such as imaging when walking, decreases.

In contrast, the solid line shows an example of the case of changing the movable range of the correction lens 103 taking into consideration the influence of shading according to the distance to a subject information.

In this way, in the present embodiment, a movable range setting table that corresponds to the distance to a subject shown by solid lines for every zoom lens position is prepared, and the movable range is changed every time the zoom lens position and/or the distance to a subject changes. Note that with this method, the movable range is frequently changed, and a large amount of memory is used to store the movable range for each zoom lens position and each distance to a subject. For this reason, a configuration is possible in which the distance to a subject is compared with a predetermined threshold value, and it is determined whether the distance to a subject is in the macro imaging region or the normal imaging region, and the movable range is set narrow only when in the macro imaging region (dashed line). By doing this, there is no need to prepare a movable range table value for every distance to a subject, and the amount of used memory can be reduced. Note that the aforementioned threshold value may be changed for every zoom lens position, or the same value may be used regardless of the zoom lens position.

In this way, a movable range taking into consideration the influence of shading can be set by setting the movable range of the correction lens 103 according to the distance to a subject information, in addition to the zoom lens position information.

Figure 5:
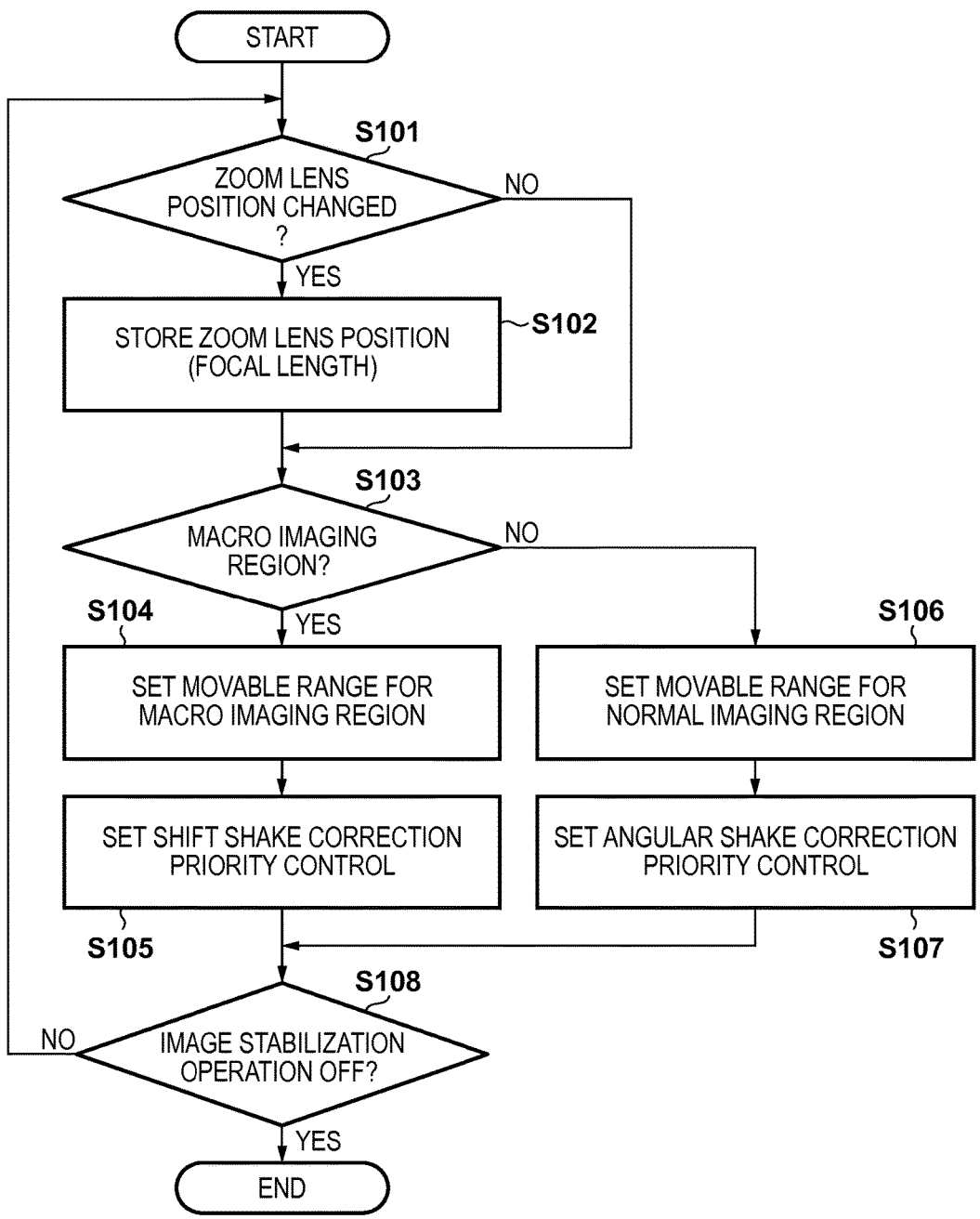
FIG. 5 is a flowchart showing a procedure for setting the movable range of the correction lens according to the embodiment.

Next, as an example of changing the movable range of the correction lens 103 in the present embodiment, the following is a detailed description of the case in which the movable range is changed depending on whether the distance to a subject is in the macro imaging region or the normal imaging region at the aforementioned zoom lens position. FIG. 5 is flowchart showing processing for setting the movable range of the correction lens 103.

First, when the image stabilization mode is selected in the operation unit 115, and the image stabilization operation is put in the ON state, whether or not the zoom lens position has changed is checked in step S101. Here, the current zoom lens position is compared with the currently held zoom lens position information, and if the zoom lens position has changed, then the procedure moves step S102, the current zoom lens position is stored, and the procedure moves to step S103. The focal length information can also be obtained from the zoom lens position information, but this focal length is a value for when the distance to a subject is an infinite distance. On the other hand, if the zoom lens position has not changed in step S101, the zoom lens position information is not updated, and the procedure moves to step S103.

The distance to a subject information is obtained in step S103, and it is determined whether the distance to a subject is in the macro imaging region or the normal imaging region based on the distance to a subject information. For example, assume that the distance to a subject is in the macro imaging region if the distance to a subject is 50 cm or less (less than or equal to a threshold value). Note that the determination may be performed using imaging magnification information obtained from the zoom lens position and the distance to a subject information, instead of the distance to a subject information, or using the focus lens position information at the time when an in-focus state is achieved by driving the focus lens 107.

If it is determined in step S103 that the distance to a subject is not in the macro imaging region (that is to say, is in the normal imaging region), the procedure moves to step S106, and the movable range for the normal imaging region is set. As an example, in the case of the wide end, 2.5 degrees is set. Then in step S107, there is a switch to image stabilization control that prioritizes angular shake correction. In the normal imaging region, the shift (translational) shake amount is small, and therefore almost all of the correction amount is an angular shake correction amount. Note that in the case in which a large shake occurs such as in imaging when walking, if a correction amount that is the total of the shift shake correction amount and the angular shake correction amount exceeds the movable range, these correction amounts are changed such that the total correction amount falls within the movable range while maintaining the ratio between the shift shake correction amount and the angular shake correction amount. In the case in which the total correction amount does not exceed the movable range, the unchanged correction amounts are used. On the other hand, for example if the angular shake correction amount is 3.0 degrees, and the shift shake correction amount is 0.3, the total correction amount is 3.3 degrees, and in the case in which the movable range is 2.5 degrees, the correction amounts are restricted while maintaining the ratio of 3.0:0.3. In this case, the angular shake correction amount is 2.27 degrees, the shift shake correction amount is 0.23 degrees, and the total correction amount is 2.5 degrees. Alternatively, the angular shake correction amount may be increased such that the correction ratio between the acceleration correction amount and the shift shake correction amount is 3:2.

On the other hand, if it is determined in step S103 that the distance to a subject is in the macro imaging region, the movable range of the correction lens 103 is set to the movable range for the macro imaging region (step S104). For example, assume that the movable range is 1.5 degrees in the case of the wide angle end. Then there is a switch to image stabilization control that prioritizes shift shake correction (step S105). The shift shake correction prioritization control here refers to a higher proportion for the shift shake correction amount when the correction amounts are limited in the case in which the total value of the angular shake correction amount and the shift shake correction amount exceeds the movable range. When performing macro imaging, imaging in which large angular shake occurs such as when imaging while walking is not often performed, and it is often the case that the user holds the camera steadily to a certain extent during imaging, and therefore more image stabilization is performed for shift shake which is more likely to occur than angular shake in macro imaging.

For example, in the case of the angular shake correction amount being 1.0 degrees and the shift shake correction amount being 1.0 degrees, the total correction amount is 2.0 degrees. In this way, in the case in which the movable range amount is exceeded, the angular shift correction amount is set to 0.6 degrees and the shift shake correction amount is set to 0.9 degrees (the ratio between the angular shake correction amount and the shift shake correction amount is 2:3) to enhance the shift shake correction effect in the macro imaging region. Also, similarly, if the total correction amount does not exceed 1.5 degrees, image stabilization is performed using the angular shake correction amount and the shift shake correction amount as is.

Next, in step S108, it is determined whether or not the image stabilization operation is set to OFF, and if the image stabilization operation is still ON, then the procedure returns to step S101, and image stabilization is continued, whereas the image stabilization is ended when the image stabilization is set to OFF.

According to the present invention as described above, an optimum movable range that is appropriate for the shading characteristics of the optical system can be set by changing the movable range of the correction lens 103 according to the zoom lens position and the distance to a subject. Accordingly, significant deterioration in image quality due to shading can be prevented, while also utilizing the image stabilization effect.

Although a favorable embodiment of the present invention has been described above, the present invention is not limited to the above-described embodiment. For example, in the case in which image stabilization is performed by driving the image sensor according to the camera shake amount, or in the case in which electronic image stabilization is performed by changing the cropping position according to the camera shake amount, etc., a similar technique can be applied, and various variations and modifications are possible within the scope of the gist of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-170890, filed Aug. 25, 2014 which is hereby incorporated by reference herein in its entirety.

What is claimed is:

1. An image processing apparatus comprising:
one or more processors programmed to perform operations of following units:
a first obtaining unit configured to obtain a focal length of an imaging optical system;
a second obtaining unit configured to obtain a distance to a subject;
a setting unit configured to set a movable range for a correction unit configured to correct camera shake, based on the focal length and the distance to a subject; and
a calculation unit configured to calculate a correction amount for correcting the camera shake within the movable range that was set by the setting unit, based on a camera shake signal from a camera shake sensor configured to detect camera shake and output the camera shake signal,
wherein the setting unit determines the movable range such that a decreasing rate of a marginal illumination of light that enters an image sensor via the imaging optical system, the decreasing rate of the marginal illumination changing according to the focal length and the distance to a subject, does not become larger than a predetermined decreasing rate.

2. The image processing apparatus according to claim 1, wherein the setting unit sets the movable range based on a table that shows a relation between the focal length, the distance to a subject, and the movable range.

3. The image processing apparatus according to claim 1, wherein the correction unit is a correction lens that can be shifted in a direction orthogonal to an optical axis of the imaging optical system, and the correction lens is driven to correct the camera shake.

4. The image processing apparatus according to claim 1, wherein the correction unit is the image sensor, and the image sensor is driven in a direction orthogonal to the optical axis of the imaging optical system to correct the camera shake.

5. The image processing apparatus according to claim 1, wherein the correction unit is a unit that shifts a cropping position of an image obtained by conversion of light entering via the imaging optical system by the image sensor, and the movable range is a movable range for the cropping position.

6. An image processing apparatus comprising:
one or more processors programmed to perform operations of following units:
a first obtaining unit configured to obtain a focal length of an imaging optical system;
a second obtaining unit configured to obtain a distance to a subject;
a setting unit configured to set a movable range for a correction unit configured to correct camera shake, based on the focal length and the distance to a subject; and
a calculation unit configured to calculate a correction amount for correcting the camera shake within the movable range that was set by the setting unit, based on a camera shake signal from a camera shake sensor configured to detect camera shake and output the camera shake signal,
wherein in a case in which the distance to a subject is less than or equal to a predetermined threshold value, the setting unit sets the movable range narrower than in a case in which the distance to a subject is greater than the predetermined threshold value.

7. The image processing apparatus according to claim 6, wherein in a case in which the distance to a subject is less than or equal to the threshold value, the setting unit sets a narrower movable range as the distance to a subject becomes shorter.

8. An image processing apparatus comprising:
one or more processors programmed to perform operations of following units:
a first obtaining unit configured to obtain a focal length of an imaging optical system;
a second obtaining unit configured to obtain a distance to a subject;
a setting unit configured to set a movable range for a correction unit configured to correct camera shake, based on the focal length and the distance to a subject; and
a calculation unit configured to calculate a correction amount for correcting the camera shake within the movable range that was set by the setting unit, based on a camera shake signal from a camera shake sensor configured to detect camera shake and output the camera shake signal,
wherein the camera shake sensor detects angular shake that occurs in an image capturing apparatus and translational shake in a plane orthogonal to the optical axis, and the calculation unit determines a correction amount for each of the angular shake and the translational shake, and changes a ratio for totaling of the correction amount for the angular shake and the correction amount of the translational shake, in accordance with the distance to a subject.

9. A method of controlling an image processing apparatus, comprising:
a first obtaining step of obtaining a focal length of an imaging optical system;
a second obtaining step of obtaining a distance to a subject;
a setting step of setting a movable range for a correction unit that corrects camera shake, based on the focal length and the distance to a subject; and
a calculation step of calculating a correction amount for correcting the camera shake within the movable range that was set in the setting step, based on a camera shake signal from a camera shake sensor configured to detect camera shake and output the camera shake signal, wherein the setting step determines the movable range such that a decreasing rate of a marginal illumination of light that enters an image sensor via the imaging optical system, the decreasing rate of the marginal illumination changing according to the focal length and the distance to a subject, does not become larger than a predetermined decreasing rate.

10. An image processing apparatus comprising:
one or more processors programmed to perform operations of following units:
an obtaining unit configured to obtain a distance to a subject;
a determination unit configured to determine whether or not macro imaging is being performed based on the distance to a subject;
a setting unit configured to, in a case in which the macro imaging is being performed, set a movable range of a correction unit that corrects camera shake narrower than in a case in which the macro-imaging is not being performed; and
a calculation unit configured to calculate a correction amount for correcting the camera shake within the movable range that was set by the setting unit, based on a camera shake signal from a camera shake sensor configured to detect camera shake and output the camera shake signal,
wherein in a case in which the distance to a subject is less than or equal to a predetermined threshold value, the setting unit sets the movable range narrower than in a case in which the distance to a subject is greater than the predetermined threshold value.

11. An image processing apparatus comprising:
one or more processors programmed to perform operations of following units:
an obtaining unit configured to obtain a distance to a subject;
a determination unit configured to determine whether or not macro imaging is being performed based on the distance to a subject;
a setting unit configured to, in a case in which the macro imaging is being performed, set a movable range of a correction unit that corrects camera shake narrower than in a case in which the macro-imaging is not being performed; and
a calculation unit configured to calculate a correction amount for correcting the camera shake within the movable range that was set by the setting unit, based on a camera shake signal from a camera shake sensor configured to detect camera shake and output the camera shake signal,
wherein the camera shake sensor detects angular shake that occurs in an image capturing apparatus and translational shake in a plane orthogonal to the optical axis, and the calculation unit determines a correction amount for each of the angular shake and the translational shake, and changes a ratio for totaling of the correction amount for the angular shake and the correction amount of the translational shake, in accordance with the distance to a subject.

12. A method of controlling an image processing apparatus, comprising:
a first obtaining step of obtaining a focal length of an imaging optical system;
a second obtaining step of obtaining a distance to a subject;
a setting step of setting a movable range for a correction unit that corrects camera shake, based on the focal length and the distance to a subject; and
a calculation step of calculating a correction amount for correcting the camera shake within the movable range that was set in the setting step, based on a camera shake signal from a camera shake sensor configured to detect camera shake and output the camera shake signal,
wherein in a case in which the distance to a subject is less than or equal to a predetermined threshold value, the setting step sets the movable range narrower than in a case in which the distance to a subject is greater than the predetermined threshold value.

13. A method of controlling an image processing apparatus, comprising:
a first obtaining step of obtaining a focal length of an imaging optical system;
a second obtaining step of obtaining a distance to a subject;
a setting step of setting a movable range for a correction unit that corrects camera shake, based on the focal length and the distance to a subject; and
a calculation step of calculating a correction amount for correcting the camera shake within the movable range that was set in the setting step, based on a camera shake signal from a camera shake sensor configured to detect camera shake and output the camera shake signal,
wherein the camera shake sensor detects angular shake that occurs in an image capturing apparatus and translational shake in a plane orthogonal to the optical axis, and the calculation step determines a correction amount for each of the angular shake and the translational shake, and changes a ratio for totaling of the correction amount for the angular shake and the correction amount of the translational shake, in accordance with the distance to a subject.

14. A method of controlling an image processing apparatus, comprising:
an obtaining step of obtaining a distance to a subject;
a determination step of determining whether or not macro imaging is being performed based on the distance to a subject;
a setting step of, in a case in which the macro imaging is being performed, setting a movable range of a correction unit that corrects camera shake narrower than in a case in which the macro-imaging is not being performed; and
a calculation step of calculating a correction amount for correcting the camera shake within the movable range that was set in the setting step, based on a camera shake signal from a camera shake sensor configured to detect camera shake and output the camera shake signal,
wherein in a case in which the distance to a subject is less than or equal to a predetermined threshold value, the setting step sets the movable range narrower than in a case in which the distance to a subject is greater than the predetermined threshold value.

15. A method of controlling an image processing apparatus, comprising:
an obtaining step of obtaining a distance to a subject;
a determination step of determining whether or not macro imaging is being performed based on the distance to a subject;
a setting step of, in a case in which the macro imaging is being performed, setting a movable range of a correction unit that corrects camera shake narrower than in a case in which the macro-imaging is not being performed; and a calculation step of calculating a correction amount for correcting the camera shake within the movable range that was set in the setting step, based on a camera shake signal from a camera shake sensor configured to detect camera shake and output the camera shake signal, wherein the camera shake sensor detects angular shake that occurs in an image capturing apparatus and translational shake in a plane orthogonal to the optical axis, and the calculation step determines a correction amount for each of the angular shake and the translational shake, and changes a ratio for totaling of the correction amount for the angular shake and the correction amount of the translational shake, in accordance with the distance to a subject.

* * * * *